United States Patent

Hyosu et al.

[11] 4,016,133
[45] Apr. 5, 1977

[54] FLUORESCENT COLORED RESIN PARTICLES AND PROCESS FOR PREPARATION THEREOF

[75] Inventors: Yoshihiko Hyosu; Eiiti Miyashita; Noboru Kuzuba, all of Kamakura; Sadayasu Miyahara, Fujisawa; Ryoshiro Takano, Kamakura, all of Japan

[73] Assignee: Sinloihi Co., Kamakura, Japan

[22] Filed: Sept. 3, 1975

[21] Appl. No.: 610,078

Related U.S. Application Data

[63] Continuation of Ser. No. 452,375, March 18, 1974, abandoned, which is a continuation of Ser. No. 207,797, Dec. 14, 1971, abandoned.

[52] U.S. Cl. .................... 260/42.21; 526/273; 526/292
[51] Int. Cl.² ............................. C08K 5/00
[58] Field of Search ... 260/42.53, 29.6 R, 29.6 TA, 260/29.6 T, 29.6 AN, 80.72, 80.75, 42.21

[56] References Cited

UNITED STATES PATENTS

| | | | |
|---|---|---|---|
| 3,190,850 | 6/1965 | Burke | 260/38 |
| 3,364,186 | 1/1968 | Wilhelm | 260/80.72 |
| 3,423,481 | 1/1969 | Mizutani | 260/836 |
| 3,652,476 | 3/1972 | Fellers | 260/80.72 |
| 3,922,232 | 11/1975 | Schein | 260/42.53 |

FOREIGN PATENTS OR APPLICATIONS 770,889  3/1957  United Kingdom

Primary Examiner—Paul R. Michl

[57] ABSTRACT

Colored resin particles which are colored uniformly and densely and are excellent in fluorescence, light fastness and washing resistance are prepared by copolymerizing in an aqueous medium in the presence of a water-soluble fluorescent dye (1) a polymerizable unsaturated monomer A having a low affinity for the fluorescent dye, (2) a polymerizable unsaturated monomer B having at least one cyano group and (3) a polymerizable unsaturated monomer C having a high affinity for the fluorescent dye and being insoluble or barely soluble in water, which is represented by the following general formula

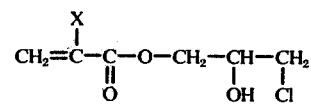

or

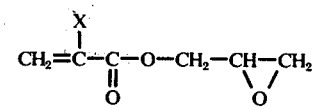

wherein X is a hydrogen atom or a methyl group.

3 Claims, No Drawings

FLUORESCENT COLORED RESIN PARTICLES AND PROCESS FOR PREPARATION THEREOF

This case is a continuation of Ser. No. 452,375, filed Mar. 18, 1974 and now abandoned which was a continuation of Ser. No. 207,797 filed Dec. 14, 1971 and now abandoned.

DESCRIPTION OF THE PRIOR ART:

Finely divided pigments of colored resins have heretofore been prepared by methods comprising coloring a resin prepared in advance with a dyestuff and pulverizing the colored resin to finely divided particles. For instance, the specifications of U.S. Pat. No. 2,938,873 and 3,116,256 disclose a process for obtaining colored resin particles where a copolycondensate of an aminotriazine compound and an aromatic monosulfonamide compound with formaldehyde is employed as the substrate resin and it is colored with a coloring dyestuff and then pulverized. According to this conventional method, it is possible to produce colored resin particles of a relatively clear color of a relatively high concentration. However, this method is defective in the following points:

1. At a high dyestuff concentration to the substrate resin, especially at a concentration exceeding 1%, the light fastness is extremely poor.
2. Since a massive colored resin is pulverized by mechanical means, much energy is required for accomplishing the pulverization and hence, the manufacturing cost is high. Further, it is impossible to obtain colored resin particles having an average particle size less than $1.5\mu$.

In order to solve the problem arising from pulverization in this conventional method, some proposals have been made. For instance, the specification of British Pat. No. 822,709 discloses a process for preparing a painting composition which comprises forming colorless polymer particles by emulsion or suspension polymerizing vinyl chloride alone or together with a polymerizable unsaturated monomer copolymerizable with vinyl chloride, dyeing the polymer particles with a dyestuff in the presence of a dyeing assistant such as formic acid, diacetone alcohol or the like, powdering the dyed polymer, and kneading the powdered polymer with a painting vehicle. However, in such method including dyeing a polymer resin after formation of the resin, it is difficult to obtain particles of a resin colored at a high concentration. Especially when the dyestuff is used in an amount of more than about 1% based on the polymer particles, the light fastness of the resulting colored resin is extremely poor. Further, when a fabric is dyed with such colored resin particles by printing or padding, the dyestuff is leached out by a washing liquor including a detergent, sodium carbonate or the like, and therefore, the washing resistance of the colored fabric is extremely poor. More specifically, the dyestuff is often present only on the surface portions of the resin particles and on the portions close to the surface thereof, and local aggregation of the dyestuff is likely to occur.

The specification of U.S. Pat. No. 3,190,850 proposes a process for preparing colored resin particles which comprises forming a colorless copolymer of styrene or vinyl acetate, for instance, a colorless polymer having acidic groups, basic groups or polar groups, a colorless polymer with no polarity or a colorless polymer with both acidic and basic groups, by copolymerization or graft polymerization techniques, and coloring fine particles of such polymer with an acidic dyestuff, a basic dyestuff, a direct dyestuff or other dyestuff. In colored polymer particles prepared by this process, the dyestuff adsorbed on the surface of the polymer particles is likely to be leached out by water or other solution or medium. Accordingly, in order to prevent occurrence of such undesired phenomenon, it is necessary to use tannic acid, molybdic acid, sodium tungstate or other mordant. Thus the resulting resin particles lack color clearness, and it is impossible to obtain products exhibiting daylightlike fluorescence.

The specification of British Pat. No. 770,889 proposes a process for preparing colored resin particles which comprises forming colorless polymer particles consisting of acrylonitrile alone or more than 90% by weight of acrylonitrile and up to 10% by weight of glycidyl methacrylate, 2-hydroxyethyl methacrylate, dichlorostyrene, maleic anhydride, acrylamide, acrylic acid or the like and dyeing them with a water-soluble fluorescent dyestuff such as Rhodamine B, or a process which comprises dissolving a dyestuff in an acrylonitrile monomer and polymerizing the monomer. However, in case a homopolymer or copolymer is dyed with a dyestuff, the dyestuff is likely to be adsorbed only on or in the vicinity of the surface of the polymer particles and there is brought about a defect of local aggregation or condensation of the dyestuff. Further, in case colored resin particles are prepared by polymerizing acrylonitrile having a high polarity in which a dyestuff has been dissolved, aggregation of the dyestuff is readily caused to occur by the cyano group of acrylonitrile, and hence, the light fastness is low. Moreover, in case a fluorescent dyestuff is used, the resulting luminescent property is poor. It is admitted in the art that dyed acrylic fibers exhibit good luminescence and have high light fastness, and this is believed to be due to the fact that the adsorbed dyestuff is dispersed and distributed in the fibers by the stretching treatment conducted for spinning the polymer into fibers. In the case of colored resin particles such as intended in this invention, however, when acrylonitrile is merely used as the starting material, it is impossible to obtain products having high luminescent property and being excellent in the light fastness. Further, acrylonitrile is a monomer difficult to polymerize, and it is impossible to polymerize acrylonitrile existing in water in a large quantity. For instance, when polymerization is conducted in an aqueous medium comprising more than 20% of acrylonitrile, the resulting product is gelatinous and it is impossible to obtain a solid product.

It is a primary object of this invention to overcome and eliminate the foregoing defects and difficulties involved in the conventional techniques.

DETAILED DESCRIPTION OF THE INVENTION

This invention relates to fluorescent colored resin particles and a process for the preparation thereof. More particularly, the invention relates to fluorescent colored resin particles formed by copolymerizing in an aqueous medium in the presence of a water-soluble fluorescent dye, (A) a polymerizable unsaturated monomer having a low affinity for the dye (hereinafter referred to as "monomer A"), (B) a polymerizable unsaturated monomer having at least one cyano group (hereinafter referred to as "monomer B") and (C) a polymerizable unsaturated monomer having a group having a high affinity for the dye and being insoluble or barely soluble in water (hereinafter referred to as "monomer C"), which is represented by the following general formula:

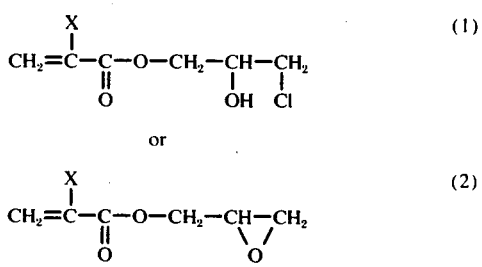

or wherein X is a hydrogen atom or a methyl group, and to a process for the preparation of said fluorescent colored resin particles.

The above fluorescent colored resin particles of this invention are characterized in that they are colored uniformly and there is no substantial difference in the dye concentration between the central portion and surface portion of individual particles, and aggregation of the dye is substantially prevented even when the fluorescent dye is used at a high concentration. Further, they have a good fluorescence and are excellent in the washing resistance and the light fastness.

This invention will now be described in detail.

A. Polymerizable unsaturated monomers to be used in this invention

In this invention, the following three kinds of polymerizable unsaturated monomers are used.

1. Polymerizable unsaturated monomer A

This monomer A is a polymerizable unsaturated monomer having a low affinity for a water-soluble fluorescent dye to be used in this invention, which will be detailed hereinafter, and the monomer A includes compounds represented by the following general formula:

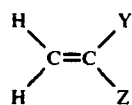

wherein Y stands for an acetoxy group, a phenyl group, a phenyl group substituted with an alkyl group having 1 to 4 carbon atoms or an alkoxy group having 1 to 2 carbon atoms, or a group

in which R stands for an alkyl group having 1 to 4 carbon atoms, and Z stands for a hydrogen atom or a lower alkyl group having 1 to 4 carbon atoms.

As specific examples of the monomer A, there can be mentioned compounds in which Y is an acetoxy group, such as vinyl acetate, compounds in which Y is a phenyl group, such as styrene, compounds in which Y is a phenyl group substituted with an alkyl group having 1 to 4 carbon atoms, such as methylstyrene, ethylstyrene, isopropylstyrene and butylstyrene, compounds in which Y is a phenyl group substituted with an alkoxy group having 1 to 2 carbon atoms, such as methoxystyrene and ethoxystyrene, and compounds in which Y is an alkoxycarbonyl group

(in which R is an alkyl group having 1 to 4 carbon atoms), such as methyl acrylate, methyl methacrylate, ethyl acrylate, ethyl methacrylate, propyl acrylate, propyl methacrylate, butyl acrylate and butyl methacrylate. These monomers may be used singly or mixtures of two or more of these monomers may also be employed.

2. Polymerizable unsaturated monomer B

The monomer B is a polymerizable unsaturated monomer having at least one cyano group. As specific examples, there can be mentioned acrylonitrile and methacrylonitrile. A mixture of two or more these monomers can also be used.

3. Polymerizable unsaturated monomer C

The monomer C is a polymerizable unsaturated monomer having a high affinity for the fluorescent dye to be used in this invention and being insoluble or barely soluble in water, which is represented by the following general formula:

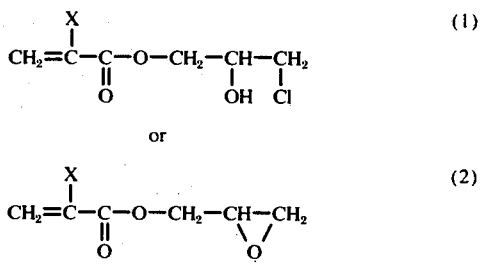

wherein X stands for a hydrogen atom or a methyl group.

As the compound of above formula (1), there can be mentioned, for example, 2-hydroxy-3-chloropropyl methacrylate and 2-hydroxy-3-chloropropyl acrylate, and as the compound of above formula (2), there can be mentioned, for example, glycidyl methacrylate and glycidyl acrylate.

In this invention, these polymerizable unsaturated monomers A, B and C are used at the following mixing ratio:

Monomer A: 35 to 89% by weight
Monomer B: 10 to 60% by weight
Monomer C: 1 to 30% by weight A preferred mixing ratio of these monomers A, B and C is as follows:
Monomer A: 35 to 85% by weight
Monomer B: 10 to 50% by weight
Monomer C: 1 to 20% by weight If the monomers A, B and C are used at a mixing ratio outside the above range, the fluorescent characteristic of the resulting colored resin particles is degraded, and there is often brought about a defect that the light fastness is lowered.

B. Water-soluble fluorescent dye to be used in this invention

The dye to be used in this invention is a water-soluble fluorescent dye free of a polymerizable double bond, which is selected from xanthene dyes, acridine dyes, thiazole dyes and benzimidazole dyes.

Further, a hydrophobic complex consisting of such water-soluble fluorescent dye and a surface active agent having a polarity opposite to that of the fluorescent dye can also be used in this invention, and the feature in which such complex is employed is included in the scope of this invention.

Specific examples of the water-soluble fluorescent dye to be used in this invention are illustrated below:

| C.I. Number | Name of Dye | Classification |
|---|---|---|
| (A) Xanthene dyes: | | |
| 45000 | Acridine Red 3B | basic dye |
| 45005 | Pyronine G | basic dye |
| 45006 | Methylene Red | basic dye |
| 45015 | Rhodamine Scarlet G | basic dye |
| 45020 | Urbine E | basic dye |
| 45050 | Rhodamine S | C.I. Basic Red 11 |
| 45090 | Rosamine | basic dye |
| 45095 | Sulphurein | acid dye |
| 45100 | Acid Red XB | C.I. Acid Red 52 |
| 45105 | Rhodamine 5G | basic dye |
| 45150 | Rhodamine G | C.I. Basic Red 8 |
| 45155 | Fast Acid Eosine G | acid dye |
| 45160 | Rhodamine 6G | C.I. Basic Red 1 |
| 45170 | Rhodamine B | C.I. Basic Violet 10 |
| 45175 | Rhodamine 3B | C.I. Basic Violet 11 |
| 45210 | Rhodamine 3G | C.I. Basic Red 3 |
| 45220 | Lissamine R-G | C.I. Acid Red 50 |
| 45350 | Fluorescein | C.I. Acid Yellow 73 |
| 45360 | Chrysoline | C.I. Acid yellow 74 |
| 45370 | Eosine H8G | C.I. Acid Orange 11 |
| 45380 | Eosine | C.I. Acid Red 87 |
| 45405 | Phloxine | C.I. Acid Red 98 |
| 45410 | Phloxine B | C.I. Acid Red 92 |
| 45420 | Cyanosine B | acid dye |
| 45425 | Erythrosine 6G | C.I. Acid Red 95 |
| 45430 | Erythrosine B | C.I. Acid Red 51 |
| (B) Acridine dyes: | | |
| 46000 | Acriflavine | basic dye |
| 46005 | Acridine Orange | C.I. Basic Orange 14 |
| 46015 | Acridine Scarlet J | basic dye |
| 46020 | Coriphosphine BG | C.I. Basic Yellow 7 |
| 46025 | Acridine Yellow G | basic dye |
| 46030 | Auracine G | C.I. Basic Yellow 6 |
| 46040 | Basic Yellow HG | C.I. Basic Yellow 9 |
| 46045 | Phosphine | C.I. Basic Orange 15 |
| 46050 | Flavophosphine Bands | basic dye |
| 46055 | Acridine Orange R | basic dye |
| 46060 | Flaveosine | basic dye |
| 46065 | Benzoflavine | basic dye |
| 46070 | Brilliant Acridine Orange R | C.I. Basic Orange 18 |
| 46075 | Phosphine AL | C.I. Basic Orange 23 |
| (C) Thiazole dyes: | | |
| 49005 | Plimo Flavine 8G | C.I. Basic Yellow 1 |
| (D) Benzimidazole dyes: | | |
| | Maxillon Brilliant Flavine 10GFF | |

These water-soluble fluorescent dyes may be used singly or in the form of mixtures of two or more of them.

As pointed out hereinabove, hydrophobic complexes consisting of a water-soluble fluorescent dye selected from the foregoing dyes (A) to (D) and a surface active agent having a polarity opposite to that of the water-soluble fluorescent dye may be used.

These hydrophobic complexes can be prepared by dissolving a water-soluble fluorescent dye such as mentioned above in water and adding to the solution a suitable amount of a surface active agent having a polarity opposite to the polarity of the water-soluble fluorescent dye, or by conducting these steps in reverse order. When the water-soluble fluorescent dye is cationic, an anionic surface active agent is used, and when the water-soluble fluorescent dye is anionic, a cationic surface active agent is used.

As the surface active agent, there can be mentioned, for example, sodium polyoxyethylene alkyl sulfate, sodium polyoxyethylene alkyl phenol sulfate, a condensation product of naphthalene sulfonic acid and formaldehyde, sodium alkyl naphthalene sulfonate, sodium dodecyl benzene sulfonate, lauryl trimethyl ammonium chloride, stearyl trimethyl ammonium chloride, distearyl dimethyl ammonium chloride, alkyl benzyl dimethyl ammonium chloride, lauryl picolynium chloride, polyoxyethylene alkyl amine, sodium lauryl amine acetate, and the like.

The water-soluble fluorescent dye is used in an amount of 0.1 to 10% by weight, preferably 0.5 to 5% by weight, based on the sum of the three polymerizable unsaturated monomers.

Water-soluble fluorescent dyes to be used in this invention have a merit that they have a higher clarity than ordinary dyes but they are defective in that their fastness to light is very poor. Accordingly, development of fluorescent colored resin particles excellent in light fastness, coloring property and washing resistance has eagerly been desired in the art. Fluorescent colored resin particles obtained by working of this invention will satisfy this desire sufficiently.

C. Combination of polymerizable unsaturated monomers with water-soluble fluorescent dye We found that properties of water-soluble fluorescent dyes to be used in this invention vary greatly depending on the kind of the substrate into which they are incorporated. As a result of our research work, we further found that best results are obtained when the water-soluble fluorescent dyes are incorporated into substrates prepared by copolymerizing the polymerizable unsaturated monomers A, B and C to be used in this invention. Combinations of the water-soluble fluorescent dye with respective monomers A. B and C will now be described.

1. Combination of water-soluble fluorescent dye with monomer A

Various water-soluble fluorescent dyes specified in this invention were mixed with various monomers A, and the solubility of the dyes was examined. It was found that the dyes are very slightly dissolved in the monomers A and major portions of the dyes are present in the massive form in the mixtures. When the mixtures were thrown into water, the dyes migrated in the aqueous phase and the monomers were kept substantially colorless.

When an emulsifier was added to such mixture and polymerization was performed under agitation in the presence of a polymerization initiator, resin particles which were slightly colored were obtained. However, the fluorescent characteristic was not observed in the product. It was found that the light fastness of the so obtained resin particles was very poor.

2. Combination of water-soluble fluorescent dye with monomer B

Various water-soluble fluorescent dyes were mixed with various monomers B, and the solubility of the dyes was examined. It was found that the dyes were dissolved in the monomers B. When such solution was thrown into water, a part of the dye migrated into the aqueous phase. When an emulsifier was added to the mixture and polymerization was performed under agitation in the presence of a polymerization initiator, densely colored resin particles were obtained but they had no fluorescent characteristic. It was found that the light fastness of the resin particles was very poor.

3. Combination of water-soluble fluorescent dye with monomer C

Various water-soluble fluorescent dyes were mixed with various monomers C, and the solubility of the dyes was examined. It was found that the dyes were dissolved in the monomers. When such solution was thrown into water, migration of the dye into the aqueous phase was not observed. When an emulsifier was added to the mixture and polymerization was performed under agitation in the presence of a polymerization initiator, densely colored resin particles were obtained but they had no fluorescent characteristic. The light fastness of the resin particles was very poor.

4. Combination of water-soluble fluorescent dye with monomers A and B

Various water-soluble fluorescent dyes were mixed with various monomers A and B, and the solubility of the dyes was examined. The dyes exhibited very good solubility. Such solution was thrown into water but almost no migration of the dye into the aqueous phase was observed. When polymerization was conducted in the same manner as described above, densely colored resin particles were obtained and they were found to have fluorescent characteristic. The light fastness of the colored resin particles was a little better than the light fastness of the particles obtained in (1) to (3) above by the single use of the monomers A, B or C.

5. Combination of water-soluble fluorescent dye with monomers A and C

Various water-soluble fluorescent dyes were mixed with various monomers A and C, and the mixtures were similarly tested. Results were substantially the same as the results obtained in (4) above.

6. Combination of water-soluble fluorescent dye with monomers B and C

The fluorescent dyes were dissolved in mixture of the monomers B and C. When such solution was thrown into water, no migration of the dye into the aqueous phase took place. When an emulsifier was added to the mixture and polymerization was performed under agitation in the presence of a polymerization initiator, densely colored resin particles were obtained. It was found that they had no fluorescent characteristic. The light fastness of the resin particles was found to be very poor.

7. Combination of water-soluble fluorescent dye with monomers A, B and C (this invention)

Various water-soluble fluorescent dyes were mixed with various monomers A, B and C, and the solubility of the dyes was examined. Each of the dyes had good solubility. When such solution was thrown into water, almost no migration of the dye was observed. When polymerization was conducted in the same manner as described above, densely colored resin particles having very excellent fluorescent characteristics were obtained. The light fastness of the so obtained product was much better than the light fastness of the products obtained in (1) to (6) above.

It was found that among colored resin particles of this invention obtained by using the monomers A, B and C in combination, colored resin particles obtained by using a compound of above formula (1) as the monomer C excel over resin particles obtained by using a compound of above formula (2) as the monomer C with respect to the fluorescent characteristic and light fastness.

Colored resin particles obtained by copolymerizing in the presence of a water-soluble fluorescent dye a mixture of monomers A and B and a water-soluble monomer other than the monomer C, for example, acrylic acid, methacrylic acid, acrylamide or the like, are densely colored and exhibit a slight fluorescence, but their washing resistance is very poor. The reason is that such water-soluble monomer has an inherent tendency to gather in the surface portion of the resulting colored resin particles.

Functions of respective monomers will now be described.

The monomer A is copolymerized with the monomers B and C and it has a function of preventing uneven distribution of the monomer B or C in the resulting resin particles. It further prevents aggregation of the water-soluble fluorescent dye and increases the stability during the polymerization process. It was found that when a compound of the above general formula in which Y is a phenyl group or a phenyl group substituted with an alkyl group having 1 to 4 carbon atoms or an alkoxy group having 1 to 2 carbon atoms, for example, styrene or vinyltoluene, is used as the monomer A, the washing resistance of the resulting resin particles is especially improved.

The cyano group-containing monomer B has a very strong electron-attracting property owing to the cyano group, and hence, it has a function of inhibiting formation of a peroxide having bad influences on the light fastness or of decomposing such peroxide. Further, the pendant cyano group in the copolymer acts as a polar group for uniformly dispersing the dye without aggregation, and it also has functions of improving the solvent resistance and increasing the softening point.

The monomer C has a group having a high affinity for the dye, and it is insoluble or barely soluble in water. Since the monomer is uniformly copolymerized with the monomers A and B, it has a function of promoting uniform adsorption of the dye.

In this invention, it is important that the water-soluble fluorescent dye be sufficiently dissolved in a mixture of the polymerizable unsaturated monomers A, B and C. If the dissolved dye migrates in the aqueous phase when copolymerization is conducted in an aqueous medium, densely colored resin particles having a good fluorescent characteristic cannot be obtained.

In case the composition of monomers to be copolymerized is other than that specified in this invention, even if migration of the dye into the aqueous phase does not take place, the dye migrates in the surface portion of the polymer or causes aggregation in the interior of the resin during the polymerization process, and hence, no fluorescent characteristic is attained in the resulting resin particles. In short, uniformly colored resin particles having a good fluorescent characteristic cannot be obtained unless a monomeric mixture containing three monomers specified in this invention at a ratio specified in this invention and a water-soluble fluorescent dye specified in this invention are used in combination.

D. Preparation Process (Polymerization Process)

When a water-soluble fluorescent dye is made present in a mixture containing the monomers A, B and C at the above-mentioned mixing ratio, the dye is uniformly dissolved in the monomeric mixture without causing aggregation. Water is added to this mixture, or the mixture is added to water. Even when an emulsifier or dispersant is added to the resulting mixture, because of the activity of the cyano group of the monomer B and the activity of the functional group of the monomer C having a high affinity for the dye, the dye is allowed to be present stably in the monomers without causing migration into the aqueous phase.

The above mixture is agitated in the presence of an emulsifier or dispersant, and the emultion or suspension is polymerized at 20° to 80° C under atmospheric pressure in air or in a nitrogen atmosphere.

Known emulsion polymerization or suspension polymerization methods can be adopted in this invention.

When polymerization is carried out according to the emulsion polymerization method, the resulting fluorescent colored resin particles have a particle size of about 0.1 to about 3μ, and when polymerization is carried out according to the suspension polymerization method, the resulting fluorescent colored resin particles have a particle size of about 5 to about 50μ. In short, in this invention, fluorescent colored resin particles having a very fine particle size can be obtained regardless of the polymerization method.

A known dispersant may be used for the polymerization. As the dispersant, there can be mentioned, for example, water-soluble polymers such as gelatin, starch, methyl cellulose, polyvinyl alcohol and polyacrylic acid salts, barely soluble salts such as barium sulfate, calcium sulfate, barium carbonate and calcium carbonate, and inorganic macromolecules such as talc, bentonite and clay. The amount added of the dispersant is about 0.2 to about 2% by weight based on the sum of the monomers A, B and C.

An emulsifier may be used for the polymerization. As the emulsifier, there can be mentioned, for example, anionic surface active agents such as higher alcohol sulfuric acid ester salts, e.g., sodium lauryl sulfate and sodium dodecylbenzene sulfonate and fatty acid salts, e.g., sodium oleate soap and potassium oleate soap, and non-ionic surface active agents such as polyoxyethylene alkyl ether and polyoxyethylene alkyl phenyl ether. The amount used of the emulsifier is about 0.2 to about 2% by weight based on the sum of the monomers A, B and C.

Various polymerization initiators can be used in this invention. Suitable initiators are chosen depending on the polymerization temperature as shown below:

| Polymerization Temperature | Suitable Polymerization Initiators |
| --- | --- |
| above 100° C. | cumene hydroperoxide, tertiary butyl peroxide |
| 30 to 100° C. | benzoyl peroxide, azobisisO-butyronitrile, lauroyl peroxide, potassium persulfate, ammonium persulfate |
| −10 to 50° C. | hydrogen peroxide-$Fe^{2+}$salt, persulfate-sodium hydrogensulfite, persulfate-sodium hydrogenphosphate |

In accordance with another embodiment of this invention, a hydrophobic complex formed by adding to the water-soluble fluorescent dye a surface active agent having a polarity opposite to that of the dye is employed. This hydrophobic complex is dissolved in a monomeric mixture of the monomers A, B and C or added to an emulsion or suspension of the monomers A, B and C. Alternately, a monomeric mixture of the monomers A, B and C is emulsified or suspended in the reaction mixture containing the hydrophobic complex. The so formed dispersion or suspension is subjected to the polymerization reaction to obtain intended colored resin particles. According to this embodiment using the hydrophobic complex, dissolution or dispersion of the dye into the monomers can be performed promptly and assuredly. In addition, this embodiment has the following great advantages:

When a surface active agent having a polarity opposite to that of the water-soluble fluorescent dye is added to the dye, it is converted to a water-insoluble dye. Because of the oleophilic property of the alkyl group of the surface active agent having a polarity opposite to that of the water-soluble fluorescent dye, the dye should naturally be made more miscible with the monomers, whereby migration of the dye into the aqueous phase is effectively prevented. Further, the surface active agent enhances the activity of preventing aggregation of the dye by the specific combination of the monomers A, B and C. Moreover, when the surface active agent having a polarity opposite to that of the water-soluble fluorescent dye is mixed with the monomers, it performs functions similar to those of the monomer C and it enhances the effects of the monomer C. Thus, dissolution or dispersion of the water-soluble fluorescent dye into the polymerizable unsaturated monomers A, B and C is enhanced so that the dye can be dissolved or dispersed in the monomers very promptly and assuredly.

Fluorescent colored resin particles obtained by working of this invention have the following effects:

1. Highly concentrated, fluorescent colored resin particles can be obtained very easily.

2. Fluorescent colored resin particles having a high light fastness can be obtained.

3. Mass production on an industrial scale is possible. The manufacturing cost can be greatly reduced as compared with conventional methods requiring the pulverizing step.

4. Products having a much reduced particle size can be obtained. More specifically, colored resin particles obtained in this invention have a much finer particle size than products obtained by conventional methods requiring the pulverizing step.

Fluorescent colored resin particles of this invention can be used for coloring various articles according to customary methods in various forms in the same manner as ordinary colored pigments are applied. For example, the colored resin particles may be used in the form of a pigment resin color for fabrics, which is obtained by suspending or emulsifying the particles in water and adding a suitable binder to the suspension or emulsion. Further, they may be used in the form of an aqueous paint prepared in a manner similar to the above. Still further, they may be used for formation of printing inks or as coloring agents for plastics after they have been powdered.

This invention will now be illustrated in more detail by reference to the following Examples and Comparative Examples which are given to demonstrate advantages of this invention.

COMPARATIVE EXAMPLE 1

A 500 ml-capacity three-neck flask equipped with an agitator and a reflux condenser was immersed in a water bath maintained at 50° C and 150 ml of distilled water was placed in the flask. Then, 2.0 g of Rhodamine B and 2.5 g of polyoxyethylene lauryl ether were added and dispersed in the water. Then, 100 g of styrene (St) from which a polymerization inhibitor had been removed was added to the charge of the flask and the mixture was agitated. Then, 0.2 g of potassium persulfate and 0.2 g of sodium hydrogenphosphate were added to the mixture and polymerization was conducted under agitation.

COMPARATIVE EXAMPLE 2

Polymerization was conducted in the same manner as in Comparative Example 1 except that methyl methacrylate (MMA) was used instead of styrene.

COMPARATIVE EXAMPLE 3

Polymerization was conducted in the same manner as in Comparative Example 1 except that vinyl acetate (VAc) was used instead of styrene.

COMPARATIVE EXAMPLE 4

Polymerization was conducted in the same manner as in Comparative Example 1 except that the amount of distilled water was increased to 200 ml and acrylonitrile (AN) was used instead of styrene.

COMPARATIVE EXAMPLE 5

Polymerization was conducted in the same manner as in Comparative Example 1 except that the amount of distilled water was increased to 200 ml and methacrylonitrile (MAN) was used instead of styrene.

COMPARATIVE EXAMPLE 6

Polymerization was conducted in the same manner as in Comparative Example 1 except that glycidyl methacrylate (GMA) was used instead of styrene.

COMPARATIVE EXAMPLE 7

Polymerization was conducted in the same manner as in Comparative Example 1 except that 2-hydroxy-3-chloropropyl methacrylate (HMA) was used instead of styrene.

COMPARATIVE EXAMPLE 8

Polymerization was conducted in the same manner as in Comparative Example 1 except that a mixture of 90 g of styrene and 10 g of acrylonitrile was used instead of 100 g of styrene.

COMPARATIVE EXAMPLE 9

Polymerization was conducted in the same manner as in Comparative Example 1 except that a mixture of 85 g of methyl methacrylate and 15 g of acrylonitrile was used instead of 100 g of styrene.

COMPARATIVE EXAMPLE 10

Polymerization was conducted in the same manner as in Comparative Example 1 except that a mixture of 70 g of styrene and 30 g of acrylonitrile was used instead of 100 of styrene.

COMPARATIVE EXAMPLE 11

Polymerization was conducted in the same manner as in Comparative Example 1 except that a mixture of 60 g of methyl methacrylate and 40 g of acrylonitrile was used instead of 100 g of styrene.

COMPARATIVE EXAMPLE 12

Polymerization was conducted in the same manner as in Comparative Example 1 except that a mixture of 50 g of vinyl acetate and 50 g of acrylonitrile was used instead of 100 of styrene.

COMPARATIVE EXAMPLE 13

Polymerization was conducted in the same manner as in Comparative Example 1 except that a mixture of 90 g of styrene and 10 g of 2-hydroxy-3-chloropropyl methacrylate (HMA) was used instead of 100 g of styrene.

COMPARATIVE EXAMPLE 14

Polymerization was conducted in the same manner as in Comparative Example 1 except that a mixture of 70 g of styrene and 30 g of 2-hydroxy-3-chloropropyl methacrylate was used instead of 100 g of styrene.

COMPARATIVE EXAMPLE 15

Polymerization was conducted in the same manner as in Comparative Example 1 except that a mixture of 50 g of methyl methacrylate and 50 g of 2-hydroxy-3-chloropropyl methacrylate was used instead of 100 g of mixture.

COMPARATIVE EXAMPLE 16

Polymerization was conducted in the same manner as in Comparative Example 1 except that a mixture of 90 g of styrene and 10 g of glycidyl methacrylate was used instead of 100 g of styrene.

COMPARATIVE EXAMPLE 17

Polymerization was conducted in the same manner as in Comparative Example 1 except that a mixture of 70 g of styrene and 30 g of glycidyl methacrylate was used instead of 100 g of styrene.

COMPARATIVE EXAMPLE 18

Polymerization was conducted in the same manner as in Comparative Example 1 except that a mixture of 50 g of methyl methacrylate and 50 g of glycidyl methacrylate was used instead of 100 g of styrene.

COMPARATIVE EXAMPLE 19

Polymerization was conducted in the same manner as in Comparative Example 1 except that a mixture of 90 g of acrylonitrile and 10 g of 2-hydroxy-3-chloropropyl methacrylate was used instead of 100 g of styrene.

COMPARATIVE EXAMPLE 20

Polymerization was conducted in the same manner as in Comparative Example 1 except that a mixture of 70 g of acrylonitrile and 30 g of 2-hydroxy-3-chloropropyl methacrylate was used instead of 100 g of styrene.

COMPARATIVE EXAMPLE 21

Polymerization was conducted in the same manner as in Comparative Example 1 except that a mixture of 50 g of acrylonitrile and 50 g of 2-hydroxy-3-chloropropyl methacrylate was used instead of 100 g of styrene.

COMPARATIVE EXAMPLE 22

Polymerization was conducted in the same manner as in Comparative Example 1 except that a mixture of 90 g of acrylonitrile and 10 g of glycidyl methacrylate was used instead of 100 of styrene.

COMPARATIVE EXAMPLE 23

Polymerization was conducted in the same manner as in Comparative Example 1 except that a mixture of 70 g of acrylonitrile and 30 g of glycidyl methacrylate was used instead of 100 g of styrene.

COMPARATIVE EXAMPLE 24

Polymerization was conducted in the same manner as in Comparative Example 1 except that a mixture of 50 g of acrylonitrile and 50 g of glycidyl methacrylate was used instead of 100 g of styrene.

EXAMPLE 1

A 500 ml-capacity three-neck flask equipped with an agitator and a reflux condenser was immersed in a water bath maintained at 50° C, and 150 ml of distilled water was placed in the flask. Then, 2.0 g of Rhodamine B and 2.5 g of polyoxyethylene lauryl ether were added and dispersed in the water. Then, 79 g of styrene, from which a polymerization inhibitor had been removed, 20 g of acrylonitrile and 1 g of glycidyl methacrylate were added to the charge of the flask. Under agitation, 0.2 g of potassium persulfate and 0.2 g of sodium hydrogenphosphate were added to the mixture and polymerization was carried out. Fluorescent colored resin particles of a magenta color excellent in light fastness and washing resistance were obtained.

EXAMPLE 2

Polymerization was conducted in the same manner as in Example 1 except that 70 g of methyl methacrylate, 20 g of acrylonitrile and 10 g of glycidyl methacrylate were used as the polymerizable unsaturated monomers. Fluorescent colored resin particles of a magenta color excellent in light fastness were obtained.

EXAMPLE 3

Polymerization was conducted in the same manner as in Example 1 except that 60 g of styrene, 20 g of acrylonitrile and 20 g of glycidyl methacrylate were used as the polymerizable unsaturated monomers. Fluorescent colored resin particles of a magenta color excellent in light fastness and washing resistance were obtained.

EXAMPLE 4

Polymerization was conducted in the same manner as in Example 1 except that 79 g of styrene, 20 g of acrylonitrile and 1 g of 2-hydroxy-3-chloropropyl methacrylate were used as the polymerizable unsaturated monomers. Fluorescent colored resin particles of a magenta color excellent in light fastness and washing resistance were obtained.

EXAMPLE 5

Polymerization was conducted in the same manner as in Example 1 except that 70 g of methyl methacrylate, 20 g of acrylonitrile and 10 g of 2-hydroxy-3-chloropropyl methacrylate were used as the polymerizable unsaturated monomers. Fluorescent colored resin particles of a magenta color excellent in light fastness were obtained.

EXAMPLE 6

Polymerization was conducted in the same manner as in Example 1 except that 60 g of styrene, 20 g of acrylonitrile and 20 g of 2-hydroxy-3-chloropropyl methacrylate were used as the polymerizable unsaturated monomers. Fluorescent colored resin particles of a magenta color excellent in light fastness and washing resistance were obtained.

Colored resin particles obtained in Comparative Examples 1 to 24 and Examples 1 to 6 were tested. The results obtained are shown in Table 1.

The concentration was evaluated on the following scale:

O : good
Δ : slightly fair
X : bad

The fluorescent characteristic was evaluated on the following scale:

⊖ : very good
0 : good
Δ : fair
X : no fluorescence

The light fastness was tested according to the test method JIS L-0841-1966 by using a fade-tester Model CF-20 (manufactured by Shimazu Seisakusho). Irradiation was conducted for 20 hours. The degree of discoloration was evaluated based on the following grade rated according to the gray scale for discoloration, JIS L-804-1965:

Grade

5: degree of discoloration corresponds to gray scale No. 5.
4: degree of discoloration corresponds to gray scale No. 4.
3: degree of discoloration corresponds to gray scale No. 3.
2: degree of discoloration corresponds to gray scale No. 2.
1: degree of discoloration corresponds to gray scale No. 1.

A higher value in the above grade means that the light fastness of the sample was better. Samples having a grade of at least 3.0 are practically applicable but it is preferred that the grade be higher than 3.5.

Sample fabrics tested were prepared by forming the colored particles into a colored dispersion having a non-volatile solid content of 50%, adding 20 g of an acrylic acid ester emulsion called the "binder" and 60 g of an aqueous emulsion of mineral spirit to the colored emulsion, blending them to form a homogeneous mixture, printing the mixture on a cotton fabric by the silk screen method and baking it at 135° C for 5 minutes.

Table 1

| Colored Resin Particles | Polymerizable Unsaturated Monomers | | | Concentration | Fluorescent Characteristic | Light Fastness |
|---|---|---|---|---|---|---|
| | Monomer A | Monomer B | Monomer C | | | |
| Comparative Example 1 | St, 100g | | | X | X | 1.0 |
| Comparative Example 2 | MMA, 100g | | | X | X | 1.0 |
| Comparative Example 3 | VAc, 100g | | | X | X | 1.0 |
| Comparative Example 4 | | AN, 100g | | O | X | 1.0 |
| Comparative Example 5 | | MAN, 100g | | O | X | 1.0 |
| Comparative Example 6 | | | GMA, 100g | O | X | 1.0 |

Table 1-continued

| Colored Resin Particles | Polymerizable Unsaturated Monomers | | | Concentration | Fluorescent Characteristic | Light Fastness |
|---|---|---|---|---|---|---|
| | Monomer A | Monomer B | Monomer C | | | |
| Comparative Example 7 | | | HMA, 100g | O | X | 1.0 |
| Comparative Example 8 | St, 90g | AN, 10g | | Δ | Δ | 2.0 |
| Comparative Example 9 | MMA, 85g | AN, 15g | | O | O | 2.5 |
| Comparative Example 10 | St, 70g | AN, 30 | | O | O | 2.5 |
| Comparative Example 11 | MMA, 60g | AN, 40g | | O | O | 2.5 |
| Comparative Example 12 | VAc, 50g | AN, 50g | | O | O | 2.5 |
| Comparative Example 13 | St, 90g | | HMA, 10g | Δ | Δ | 2.0 |
| Comparative Example 14 | St, 70g | | HMA, 30g | O | O | 2.5 |
| Comparative Example 15 | MMA, 50g | | HMA, 50g | O | O | 2.5 |
| Comparative Example 16 | St, 90g | | GMA, 10g | Δ | Δ | 1.5 |
| Comparative Example 17 | St, 70g | | GMA, 30g | O | O | 2.0 |
| Comparative Example 18 | MMA, 50g | | GMA, 50g | O | O | 2.0 |
| Comparative Example 19 | | AN, 90g | HMA, 10g | O | X | 1.0 |
| Comparative Example 20 | | AN, 70g | HMA, 30g | O | X | 1.0 |
| Comparative Example 21 | | AN, 50g | HMA, 50g | O | X | 1.0 |
| Comparative Example 22 | | AN, 90g | GMA, 10g | O | X | 1.0 |
| Comparative Example 23 | | AN, 70g | GMA, 30g | O | X | 1.0 |
| Comparative Example 24 | | AN, 50g | GMA, 50g | O | X | 1.0 |
| Example 1 | St, 79g | AN, 20g | GMA, 1g | O | O | 3.0 |
| Example 2 | MMA, 70g | AN, 20g | GMA, 10g | O | O | 3.5 |
| Example 3 | St, 60g | AN, 20g | GMA, 20g | O | O | 3.5 |
| Example 4 | St, 79g | AN, 20g | HMA, 1g | O | ⊙ | 3.5 |
| Example 5 | MMA, 70g | AN, 20g | HMA, 10g | O | ⊙ | 4.0 |
| Example 6 | St, 60g | AN, 20g | HMA, 20g | O | ⊙ | 4.0 |

COMPARATIVE EXAMPLE 25

A 500 ml-capacity three-neck flask equipped with an agitator and a reflux condenser was immersed in a water bath maintained at 50° C, and 150 ml of distilled water was placed in the flask. Then, 2.0 g of Rhodamine B and 2.5 g of polyoxyethylene lauryl ether were added and dispersed in the water. Then, 79 g of styrene, from which a polymerization inhibitor had been removed, 20 g of acrylonitrile and 1 g of methacrylic acid (MMA) were added to the charge of the flask and the mixture was agitated. Under agitation, 0.2 g of potassium persulfate and 0.2 g of sodium hydrogenphosphate were added to the mixture and polymerization was carried out.

COMPARATIVE EXAMPLE 26

Polymerization was conducted in the same manner as in Comparative Example 25 except that 70 g of styrene, 20 g of acrylonitrile and 10 g of hydroxyethyl methacrylate (HEMA) were used as the polymerizable unsaturated monomers.

COMPARATIVE EXAMPLE 27

Polymerization was conducted in the same manner as in Comparative Example 25 except that 60 g of styrene, 20 g of acrylonitrile and 20 g of acrylamide (AAM) were used as the polymerizable unsaturated monomers.

The colored resin particles obtained in these Comparative Examples 25, 26 and 27 were tested in the same manner as described above. Sample fabrics tested were prepared in the same manner as described above. The washing resistance was tested according to the test method, JIS L-0844-1970, A-4. Results are shown in Table 2. For comparison, results of the tests made on the products obtained in Examples 4 and 6 are also shown in Table 2.

Table 2

| Colored Resin Particles | Polymerizable Unsaturated Monomers | | | | Concentration | Fluorescence | Washing Resistance |
|---|---|---|---|---|---|---|---|
| | Monomer A | Monomer B | Monomer C | Other Monomer | | | |
| Example 4 | St, 79g | AN, 20g | HMA, 1g | | O | ⊙ | 4.0 |
| Example 6 | St, 60g | AN, 20g | HMA, 20g | | O | ⊙ | 4.0 |
| Comparative Example 25 | St, 79g | AN, 20g | | MAA, 1g | O | Δ | 1.0 |
| Comparative Example 26 | St, 70g | AN, 20g | | HEMA, 10g | O | Δ | 1.0 |
| Comparative Example 27 | St, 60g | AN, 20g | | AAM, 20g | O | Δ | 1.0 |

COMPARATIVE EXAMPLE 28

A 500 ml-capacity three-neck flask equipped with an agitator and a reflux condenser was immersed in a water bath maintained at 50° C, and 150 ml of distilled water was placed in the flask. Then, 2.5 g of polyoxyethylene lauryl ether was added and dispersed in the water, and 79 g of styrene, from which a polymerization inhibitor had been removed, 20 g of acrylonitrile and 1 g of 2-hydroxy-3-chloropropyl methacrylate were added to the charge of the flask and the mixture was agitated. Under agitation, 0.2 g of potassium persulfate and 0.2 g of sodium hydrogenphosphate were added and polymerization was conducted. Then, 2.0 g of Rhodamine B was added to the resulting polymer and the temperature was elevated to 80° C. This temperature was maintained for 5 hours to effect adsorption of the dye.

COMPARATIVE EXAMPLE 29

Polymerization was conducted in the same manner as in Comparative Example 28 except that 70 g of methyl methacrylate, 20 g of acrylonitrile and 10 g of 2-hydroxy-3-chloropropyl methacrylate were used as the polymerizable unsaturated monomers. The resulting polymer was colored with the dye in the same manner as in Comparative Example 28.

COMPARATIVE EXAMPLE 30

Polymerization was conducted in the same manner as in Comparative Example 28 except that 60 g of styrene, 20 g of acrylonitrile and 20 g of 2-hydroxy-3-chloropropyl methacrylate were used as the polymerizable unsaturated monomers. The resulting polymer was colored with the dye in the same manner as in Comparative Example 28.

The colored resin particles obtained in Comparative Examples 28, 29 and 30 were tested in the same manner as described above by using sample fabrics prepared in the same manner as described above. Results obtained are shown in Table 3. Results of the tests made on the products obtained in Examples 4, 5 and 6 are also shown in Table 3 for comparison.

inhibitor had been removed, 45 g of acrylonitrile and 5 g of 2-hydroxy-3-chloropropyl methacrylate were added dropwise to the charge of the flask under agitation. At a point when a part of the monomer mixture had been added dropwise, 0.4 g of ammonium persulfate was added to the mixture. An aqueous solution of 0.4 g of sodium hydrogensulfite in 10 g of water was gradually added dropwise to the mixture as the polymerization temperature was observed. Polymerization was conducted for about 8 hours. Fluorescent colored resin particles of a pink color excellent in light fastness and washing resistance were obtained.

EXAMPLE 10

Polymerization was conducted in the same manner as in Example 9 except that 3.0 g of Maxillon Brilliant Table 3

| Colored Resin Particles | Polymerizable Unsaturated Monomers | | | Concentration | Fluorescence | Light Fastness | Remarks |
|---|---|---|---|---|---|---|---|
| | Monomer A | Monomer B | Monomer C | | | | |
| Example 4 | St, 79g | AN, 20g | HMA, 1g | O | ʘ | 3.5 | |
| Example 5 | MMA, 70g | AN, 20g | HMA, 10g | O | ʘ | 4.5 | |
| Example 6 | St, 60g | AN, 20g | HMA, 20g | O | ʘ | 4.0 | |
| Comparative Example 28 | St, 79g | AN, 20g | HMA, 1g | Δ | Δ | 1.5 | post dyeing |
| Comparative Example 29 | MMA, 70g | AN, 20g | HMA, 10g | Δ | Δ | 2.0 | post dyeing |
| Comparative Example 30 | St, 60g | AN, 20g | HMA, 20g | Δ | Δ | 2.0 | post dyeing |

EXAMPLE 7

A 500 ml-capacity three-neck flask equipped with an agitator and a reflux condenser was immersed in a water bath maintained at 50° C and 150 ml of distilled water was placed in the flask. Then, 1.0 g of polyvinyl alcohol, 1.0 g of sodium polyoxyethylene alkyl phenyl sulfate and 3.0 g of Rhodamine 5G (C.I. No. 45105) were added to the distilled water, and 60 g of styrene, from which a polymerization inhibitor had been removed, 30 g of acrylonitrile and 10 g of 2-hydroxy-3-chloropropyl methacrylate were added to the charge of the flask and the mixture was agitated for 2 hours. Under agitation, 0.6 g of potassium persulfate and 0.4 g of sodium hydrogensulfite were added to the mixture and polymerization was carried out. Fluorescent colored resin particles of an orange color excellent in light fastness and washing resistance were obtained.

EXAMPLE 8

Polymerization was conducted in the same manner as in Example 7 except that 40 g of methyl methacrylate, 55 g of acrylonitrile and 5 g of glycidyl methacrylate were used as the polymerizable unsaturated monomers and 5.0 g of Plimo Flavine 8G (C.I. No. 49005) was used as the water-soluble fluorescent dye. Fluorescent colored resin particles of a yellow color excellent in light fastness were obtained.

EXAMPLE 9

A 500 ml-capacity three-neck flask equipped with an agitator and a reflux condenser was immersed in a water bath maintained at 50° C, and 150 ml of distilled water was placed in the flask. Then, 1.0 g of gum arabic, 2.0 g of polyoxyethylene lauryl ether, 1.5 g of Rhodamine 3B (C.I. No. 45175) and 1.5 of Rhodamine 6G (C.I. No. 45160) were added to the water in the flask, and 50 g of styrene, from which a polymerization Flavine 10GF was used as the water-soluble fluorescent dye. Fluorescent colored resin particles excellent in light fastness and washing resistance were obtained.

EXAMPLE 11

A 500 ml-capacity three-neck flask equipped with an agitator and a reflux condenser was immersed in a water bath maintained at 50° C., and 150 ml of distilled water was placed in the flask. Then, 2.0 g of sodium alkyl sulfate and 0.2 g of sodium alginate were added to the distilled water, and a solution of 1.5 g of Acid Red XB (C.I. No. 45100) in a monomeric mixture of 80 g of vinyl acetate, from which a polymerization inhibitor had been removed, 18 g of methacrylonitrile and 2.0 g of glycidyl acrylate was added to the charge of the flask. The mixture was agitated for 2 hours. Then, 2.0 g of potassium persulfate was added to the mixture under agitation and polymerization was carried out for 6 hours. Fluorescent colored resin particles of a magenta color were obtained.

EXAMPLE 12

A 500 ml-capacity three-neck flask equipped with an agitator and a reflux condenser was immersed in a water bath maintained at 50° C and 150 ml of distilled water was placed in the flask. Then, 3.0 g of Rhodamine 3B (C.I. No. 45175), 1.0 g of polyvinyl alcohol, 1.0 g of sodium polyoxyethylene alkyl phenyl sulfate and 3.0 g of sodium dodecyl benzene sulfonate were added to distilled water to precipitate a hydrophobic complex. Then, 60 g of styrene, from which a polymerization inhibitor had been removed, 35 g of acrylonitrile and 5 g of 2-hydroxy-3-chloropropyl methacrylate were added to the charge of the flask, and the mixture was agitated for 2 hours. Under agitation, 0.6 g of potassium persulfate and 0.3 g of sodium hydrogensulfite were added to the mixture and polymerization was conducted. Fluorescent colored resin particles of a magenta color excellent in light fastness and washing resistance were obtained.

EXAMPLE 13

Polymerization was conducted in the same manner as in Example 12 except that Acid Red XB (C.I. No. 45100) was used as the water-soluble fluorescent dye and stearyl trimethyl ammonium chloride was used instead of sodium dodecyl benzene sulfonate. Fluorescent colored resin particles of a magenta color were obtained.

EXAMPLE 14

A 500 ml-capacity three-neck flask equipped with an agitator and a reflux condenser was immersed in a water bath maintained at 50° C and 150 ml of distilled water was placed in the flask. Then, 2.0 g of Rhodamine 3B (C.I. No. 45175) and 2.5 g of polyoxyethylene lauryl ether were added and dispersed in the distilled water. Then, 80 g of vinyltoluene, from which a polymerization inhibitor had been removed, 15 g of acrylonitrile and 5.0 g of glycidyl methacrylate were added to the charge of the flask, and the mixture was agitated. Under agitation, 0.4 g of potassium persulfate and 0.2 g of sodium hydrogenphosphate were added to the mixture and polymerization was conducted for 6 hours. Fluorescent colored resin particles of a magenta color excellent in light fastness and washing resistance were obtained.

EXAMPLE 15

Polymerization was conducted in the same manner as in Example 14 except that Acriflavine (C.I. No. 46000) was used as the water-soluble fluorescent dye. Fluorescent colored resin particles of a yellow color excellent in light fastness and washing resistance were obtained.

EXAMPLE 16

Polymerization was conducted in the same manner as in Example 14 except that 2.0 g of $\alpha,\alpha'$-azobisisobutyronitrile was used as the polymerization initiator. Fluorescent colored resin particles of a magenta color excellent in light fastness and washing resistance were obtained.

EXAMPLE 17

Polymerization was conducted in the same manner as in Example 14 except that 70 g of methyl methacrylate, 20 g of acrylonitrile and 10 g of glycidyl acrylate were used as the polymerizable unsaturated monomers. Fluorescent colored resin particles of a magenta color excellent in light fastness were obtained.

EXAMPLE 18

Polymerization was conducted in the same manner as in Example 14 except that 70 g of methyl methacrylate, 20 g of acrylonitrile and 10 g of 2-hydroxy-3-chloropropyl acrylate were used as the polymerizable unsaturated monomers. Fluorescent colored resin particles of a magenta color excellent in light fastness were obtained.

What is claimed is:

1. A process for the preparation of fluorescent colored resin particles which comprises copolymerizing in an aqueous medium in the presence of a water-soluble fluorescent dye which is at least one member selected from the group consisting of xanthenes, acridines, thiazoles and benzimidazoles, a mixture of monomers comprising
   A. a polymerizable unsaturated monomer having a low affinity for said dye, which is selected from compounds having the formula

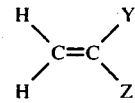

wherein Z is a member selected from the group consisting of hydrogen atom and lower alkyl groups having 1 to 4 carbon atoms and Y is a member selected from the group consisting of acetoxy and phenyl groups, phenyl groups substituted with a lower alkyl group having 1 to 4 carbon atoms, phenyl groups substituted with an alkoxy group having 1 to 2 carbon atoms, and groups

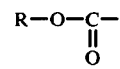

in which R is a lower alkyl group having 1 to 4 carbon atoms,
   B. a polymerizable unsaturated monomer having at least one cyano group, which is selected from the group consisting of acrylonitrile and methacrylonitrile, and
   C. at least one water-insoluble or barely water-soluble polymerizable unsaturated monomer containing a group having a high affinity for said dye, said monomer being selected from the group consisting of compounds having the formula

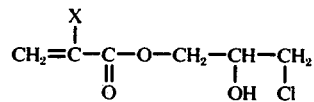

wherein X is a hydrogen atom or a methyl group, whereby said fluorescent dye is uniformly dispersed in the resin particles.

2. A process according to claim 1 wherein a mixture containing 35 to 89% by weight of said polymerizable unsaturated monomer (A), 10 to 60% by weight of said polymerizable unsaturated monomer (B) and 1 to 30% by weight of said polymerizable unsaturated monomer (C) is copolymerized.

3. A process according to claim 1 wherein said polymerizable unsaturated monomers (A), (B) and (C) are copolymerized in the presence of a hydrophobic complex consisting of said fluorescent water-soluble dye and a surface active agent having a polarity opposite to that of said fluorescent water-soluble dye.

* * * * *